US011338964B2

(12) United States Patent
Lewandowski et al.

(10) Patent No.: US 11,338,964 B2
(45) Date of Patent: May 24, 2022

(54) UNIT FOR BONDING A CONTAINER, ESPECIALLY A PRESSURISED BEVERAGE CONTAINER, WITH THE LID, AND A PREFORM FOR PRODUCING THE CONTAINER

(71) Applicant: REEND SPOLKA Z OGRANICZONA ODPOWIEDZIALNOSCIA, Krzemieniewo (PL)

(72) Inventors: Dariusz Lewandowski, Warsaw (PL); Roman Sobecki, Gostyń (PL)

(73) Assignee: REEND SPOLKA Z OGRANICZONA ODPOWIEDZIALNOSCIA, Krzemieniewo (PL)

( * ) Notice: Subject to any disclaimer, the term of this patent is extended or adjusted under 35 U.S.C. 154(b) by 94 days.

(21) Appl. No.: 16/678,108

(22) Filed: Nov. 8, 2019

(65) Prior Publication Data
US 2021/0139203 A1 May 13, 2021

(51) Int. Cl.
*B65D 43/02* (2006.01)
*B65D 1/16* (2006.01)

(52) U.S. Cl.
CPC ......... *B65D 43/0202* (2013.01); *B65D 1/165* (2013.01); *B65D 2543/00092* (2013.01);
(Continued)

(58) Field of Classification Search
CPC ............... B65D 43/0202; B65D 1/165; B65D 2543/00092; B65D 2543/00296; B65D 2543/00425
(Continued)

(56) References Cited

U.S. PATENT DOCUMENTS 4,487,326 A 12/1984 Uhlig
4,640,435 A 2/1987 Dutt
(Continued)

FOREIGN PATENT DOCUMENTS

EP 0482652 B1 4/1992
PL 207809 B1 2/2011
PL 208833 B3 6/2011

*Primary Examiner* — J. Gregory Pickett
*Assistant Examiner* — Niki M Eloshway
(74) *Attorney, Agent, or Firm* — Myers Wolin, LLC (57) ABSTRACT

A unit for bonding the container with the lid, made of plastic, designated especially for pressurised beverages, having a profiled rim of the container opening and a profiled rim of the lid, characterised in that the profiled rim of the opening (2) of the container (1) comprises a flange (3) formed around the said opening (2), extending outwards away from the side wall of the container, where the flange (3) has a top surface (4), side surface (5) and bottom surface (6) bonded to the external side surface of the container (1), and where formed on the top surface (4) around the opening (2) of the container (1) there is a rib (7) protruding above the surface (4), while the profiled rim of the lid (8) comprises a groove (9) formed on the bottom surface (10) of the lid (8) around its bottom edge, the groove (9) accommodating the said rib (7) which supports the lid (8) without touching on the top surface (4) of the flange (3), where there is an energy director (12, 13) formed on the bottom of the groove (9) or the top surface of the rib (7), which focuses ultrasonic energy in the process of ultrasonic welding of the rib (7) and the lid (8).

5 Claims, 7 Drawing Sheets

(52) U.S. Cl.
CPC .............. *B65D 2543/00296* (2013.01); *B65D 2543/00425* (2013.01)

(58) Field of Classification Search
USPC ................................ 220/359.1, 359.4, 359.5
See application file for complete search history.

(56) References Cited

U.S. PATENT DOCUMENTS

| | | | |
|---|---|---|---|
| 4,747,511 A | | 5/1988 | Dutt et al. |
| 5,310,075 A | * | 5/1994 | Wyler .................... F21V 31/00 174/50 |
| 5,531,345 A | * | 7/1996 | Nakamura ............ H02G 3/088 220/3.8 |
| 5,782,370 A | * | 7/1998 | Kamiya ............... H05K 9/0067 220/284 |
| 6,708,839 B2 | | 3/2004 | Diesterbeck |
| 6,927,335 B2 | * | 8/2005 | Lim ....................... H02G 3/081 174/50 |
| 8,052,001 B2 | * | 11/2011 | Chen ..................... H05K 5/066 220/4.02 |
| 8,905,017 B2 | * | 12/2014 | Hausmann ............. A61M 11/06 128/200.14 |
| 2005/0173044 A1 | * | 8/2005 | Drummond ....... B29C 66/12461 156/69 |
| 2007/0062375 A1 | * | 3/2007 | Liverani ............ B65D 85/8043 99/279 |
| 2007/0164020 A1 | * | 7/2007 | Arnett .................. A45C 13/008 220/4.21 |

* cited by examiner

UNIT FOR BONDING A CONTAINER, ESPECIALLY A PRESSURISED BEVERAGE CONTAINER, WITH THE LID, AND A PREFORM FOR PRODUCING THE CONTAINER

The invention concerns a unit for bonding a container, especially a pressurised beverage container, with the lid, made of plastic, and a preform for producing the container.

So far, container bodies made of plastic under the preform blow moulding method, designated for beverages, pressurised beverages in particular, have been closed with a metal lid by rolling the flange of the container body together with the metal lid, performed on standard filling machines.

Known from patent documents PL 207 809 B1 and PL 208 833 B3 is a preform of a plastic container for producing thin-walled pressurised containers in the process of blow moulding on blow moulding machines, the container designed for being closed hermetically with a metal lid by rolling the container flange together with the lid, performed on filling machines. The preform contains a body in the shape of an open cone with convex arc-shaped bottom, where opposite the bottom there is a cylinder-like end finished with a thin flange bending outwards, designated for bonding with the metal lid by rolling.

Known from patent document EP 0482652 B1 is a preform cylindrical in shape and with a flat bottom, fitted with a flange designated for rolling with the metal lid on filling machines, where the preform bottom is substantially thinner than preform sides and its edges inclined outwards slightly. The described known containers are made of two different materials, permanently bonded with each other, i.e. plastic and metal, which substantially complicates their recycling.

Known from patent document U.S. Pat. No. 4,487,326 is a carbonated beverage package. The package comprises a plastic container and a lid of plastic material. The container has an opening with a peripheral lip, and the lid has a downwardly and outwardly inclined annular surface and a pressurised rib.

Known from patent document U.S. Pat. No. 4,640,435 is a container for carbonated beverages. The container comprises a plastic lid which snaps onto the container. The container includes a neck portion having an extending ridge and a mouth there above, unitarily formed at the top of the can. The lid is rigid and has a concave top wall and a peripheral rim.

Known from patent document U.S. Pat. No. 4,747,511 is a snap-on connection between a pressurised beverage can made of plastic and a lid formed from the same plastic material. The top edge of the can and the edge of the lid have rims in the shape of inverted V, and their interlock on the locking groove. When assembled, the locking groove of the lid receives the entire top edge of the container, thus forming an interlocking joint. The locking flange and the locking groove are so dimensioned as to produce an inward flexing as they come together, with the flange snapping over a locking bead formed within the downwardly facing locking groove.

Known from document U.S. Pat. No. 6,708,839 B2 is a plastic container with a snap lid and a snap element provided on the upper edge area of the container, the lid having an area in tight contact with the container's upper edge area, where the container edge on the side of the snap element facing the top edge of the container is provided with at least one integrally moulded reinforcing rib projecting radially and extending over at least a segment of the circumference of the container. The reinforcing rib is provided on a downward-facing, circumferential collar region, which is joined in the top region of the container and is positioned at the level of the sealing area on the lid, which may be formed in the shape of a circumferential rib. The lid rests on the inner reinforcing rib.

In the known containers, the structure of the snap units which join the container bodies with the lids is complicated and requires the container body and the lid to be performed with high precision so as to satisfy the strength and tightness requirements applicable to pressurised beverage containers.

The structure of the known snap-on units for joining container body with the lid prevents their application on standard beverage production lines, does not ensure the expected production output in industrial scale production, and does not guarantee that the bond formed will be resistant to the inner pressurised and hermetic over the period of time required for carbonated beverages.

The purpose of the described invention is to develop a unit for bonding a container with the lid, both made of plastic, which would guarantee high strength parameters required especially for pressurised beverages, as well as to obtain highly efficient packing of beverages on production lines and facilitate segregation of the used containers for recycling.

In particular, the purpose of the invention is to develop the structure of the rim of the preform used to produce the container, and the structure of the rim of the lid, both made of plastic and designed to be bonded together under the ultrasonic welding method.

A unit for bonding the container with the lid, made of plastic, designated especially for pressurised beverages, comprising a profiled rim of the container opening and a profiled rim of the lid, according to the invention, is characterised in that the profiled rim of the container opening comprises a flange formed around the said opening, extending outwards away from the side wall of the container, where the flange has a top surface, side surface, and bottom surface, and where formed on the top surface around the container opening there is a rib protruding above the surface, while the profiled rim of the lid comprises a groove formed on the bottom surface of the lid around its bottom edge, the groove accommodating the said rib which supports the lid without touching on the top surface of the flange, where there is at least one energy director formed on the bottom of the groove and/or the top surface of the rib, which focuses ultrasonic energy in the process of ultrasonic welding of the rib and the lid.

Preferably, the energy director is triangular in cross section.

Preferably, there are slits between the side walls of the rib and the side walls of the groove.

Preferably, the bottom surface of the flange around the container opening edge is basically perpendicular to the side surface of the container at their convergence.

Preferably, the flange around the container opening edge has a peripheral groove formed on its side surface.

Preferably, there is/are a peripheral groove or transverse grooves formed on the side surface of the lid edge.

Preferably, the container and the lid are made of the same plastic material.

A preform of the plastic container, designated especially for pressurised beverages, having a body ended with a bottom on one side, and with an opening with a profiled rim designed to be bonded with the lid on the other side, according to the invention, is characterised in that the profiled rim of the preform opening has a flange formed around the opening, extending outwards away from the side wall of the preform and having the top surface, side surface, and bottom surface, where formed on the top surface of the flange around the opening there is a rib protruding above that surface.

Preferably, the bottom surface of the flange is basically perpendicular to the side surface of the preform at their convergence.

Preferably, the flange rib ends with an energy director which focuses ultrasonic energy in the process of ultrasonic welding of the rib and the lid. The energy director is a single-piece element or is made up of segments.

Preferably, the energy director is triangular in cross section.

Preferably, there is a peripheral groove formed on the side surface of the flange around the rim of the preform opening.

The solution according to the invention allows to obtain a durable and tight bond between the container body and the lid in the process of ultrasonic welding, which enables to perform the bonding operation on at least 30 thousand containers in 1 hour.

Thanks to the positioning the energy director on the bottom of the groove formed in the lid, or on the top surface of the rib formed around the container opening it is possible to obtain a bond between the container and the lid characterised by high strength parameters, since the process of ultrasound welding turns the energy director into a weld which bond the bottom of the groove with the top of the rib, and the side surfaces of the rib with the side surfaces of the groove. Moreover, the distance to the energy director to be covered by ultrasonic waves is the shortest possible, thanks to which the welding process is possibly shortest, too. In addition, the positioning of the energy director in accordance with the invention prevents the bonded parts from being wetted with the beverage in the course of the ultrasonic welding process.

The bottom surface of the flange, which extends outside the preform, serves as the retaining surface in the container production process, or, when the container is ready, as the surface suitable for supporting the container flange on the sonotrode anvil in the process of ultrasonic welding of the lid rim with the rim of the container body. The peripheral groove formed on the side surface of the container flange, and the peripheral groove and/or axial grooves formed on the side surface of the lid substantially facilitate the positioning and assembly of the lid on top of a filled container.

The solution according to the described invention can be used for container openings of different shapes and matching lids. The rib can be formed around the container opening of any desired shape, with the groove of the corresponding shape formed in the lid. The groove in the lid and the rib may take the shape dictated by the shape of the container opening.

Further benefits and advantages of the present invention will become apparent after a careful reading of the detailed description with appropriate reference to the accompanying drawings.

In exemplary embodiments of the invention a unit for bonding the container with the lid, made of plastic, designated especially for pressurised beverages comprises a profiled rim of the opening of the container 1 and profiled rim of the lid 8. The profiled rim of the opening 2 of the container 1 comprises a flange 3 formed around the said opening 2. Opening 2 can be given e.g. the circular shape. The flange 3 extends outwards away from the side surface of the container and has the top surface 4, side surface 5 and bottom surface 6. Formed around the opening 2 of the container 1, on the top surface 4 of the flange 3 there is a rib 7 protruding above the surface 4, while the profiled rim of the lid 8 comprises a groove 9 formed on the bottom surface 10 of the lid 8 around its bottom edge. The groove 9 accommodates the said rib 7 which supports the lid 8 without touching on the top surface 4 of the flange 3. The bottom surface 6 of the flange 3 formed around the edge of the opening 2 of the container 1 is basically perpendicular to the side surface of the container 1 at their convergence.

Figure 1:
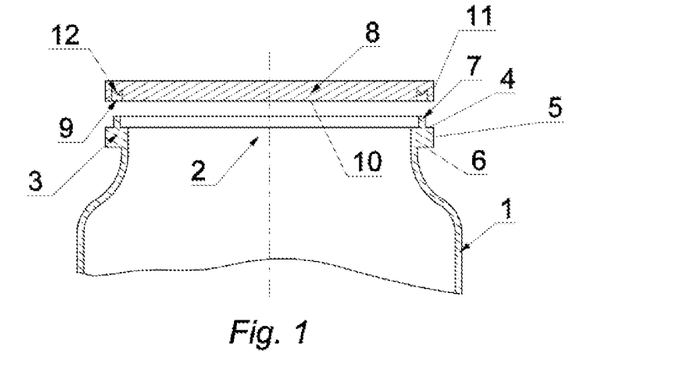
FIG. 1—shows the top part of the container and the lid provided with the energy director, in their position to each other prior to their assembly for ultrasonic welding, all in cross section.
Figure 2:
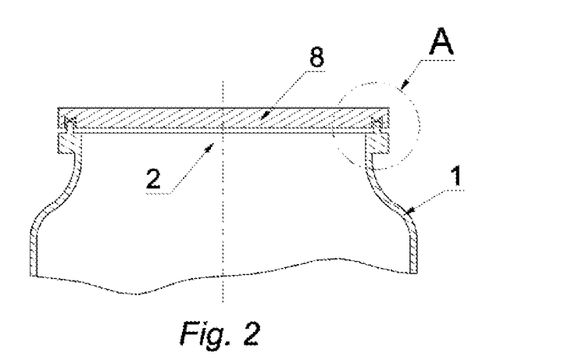
FIG. 2—presents the top part of the container and the lid as in FIG. 1, assembled together for ultrasonic welding, in cross section.
Figure 3:
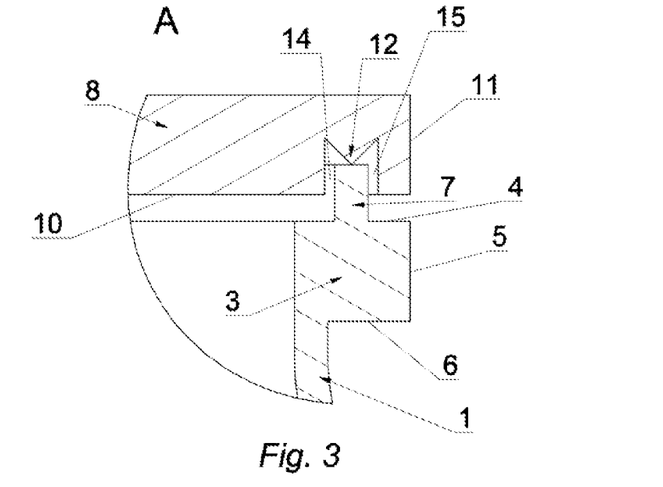
FIG. 3—depicts a zoomed-in view of the unit for bonding the container with the lid, as in FIG. 2, prior to ultrasonic welding, in cross section.

In the first exemplary embodiment shown on FIG. 1 to FIG. 3, formed on the bottom of the groove 9 there is an energy director 12, triangular in cross-section with the apex pointing towards the rib 7, which focuses ultrasonic energy in the process of ultrasonic welding of the rib 7 and the lid 8, while the top surface of the rib 7 is flat.

Figure 4:
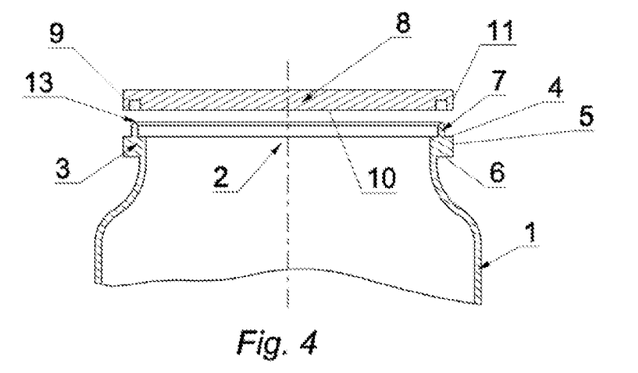
FIG. 4—shows the top part of the container provided with the energy director and the lid, in their position towards each other prior to their assembly for ultrasonic welding, all in cross section.
Figure 6:
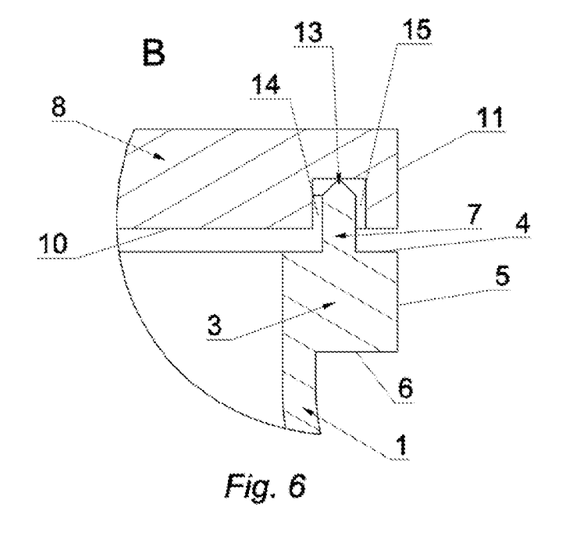
FIG. 6—depicts a zoomed-in view of the unit for bonding the container with the lid, as in FIG. 5, prior to ultrasonic welding, in cross section.
Figure 7:
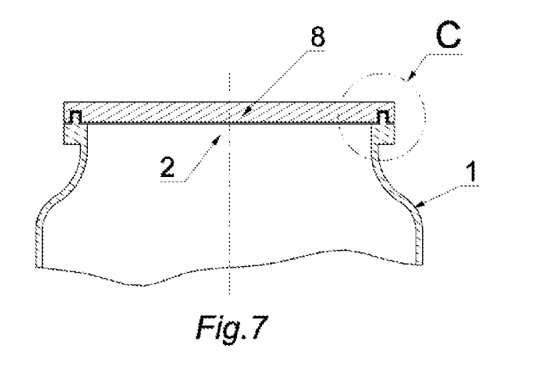
FIG. 7—shows the bond between the container and the lid following ultrasonic welding of the unit as in FIG. 1 to FIG. 3 and FIG. 4 to FIG. 6, in cross section.

In the second exemplary embodiment shown on FIG. 4 and FIG. 6, formed on top of rib 7 is the energy director 13 triangular in cross section, with the apex pointing towards the groove 9, where the energy director focuses the ultrasonic energy in the process of ultrasonic welding of the rib 7 and the lid 8, while the bottom of the groove 9 is flat.

Figure 9:
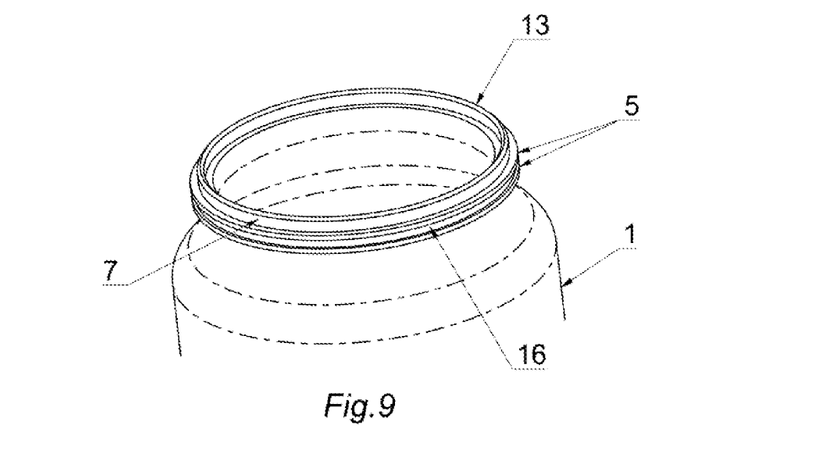
FIG. 9—shows the top part of the container with the energy director as a single-piece element, and with the peripheral groove in the side surface of the flange, in a perspective view.
Figure 10:
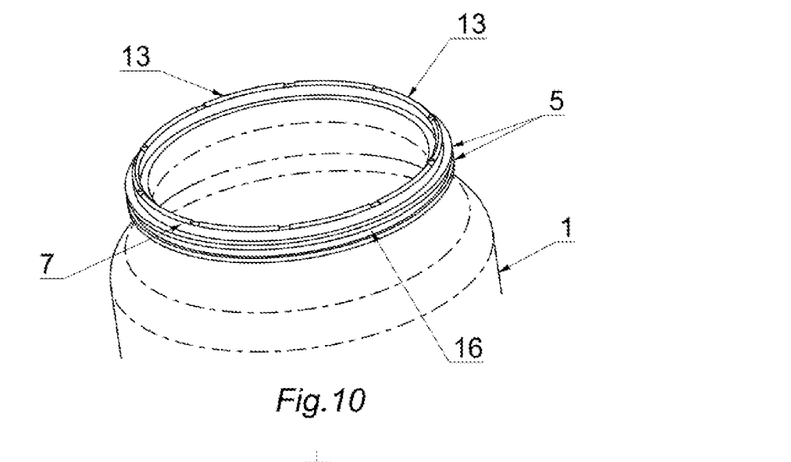
FIG. 10—shows the top part of the container with the energy director which is made up of segments, in a perspective view.
Figure 11:
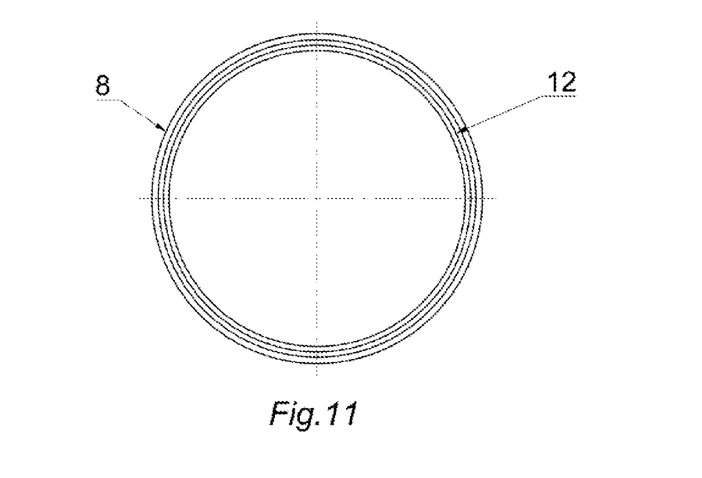
FIG. 11—presents the lid with the energy director as a single-piece element, in a bottom view.
Figure 12:
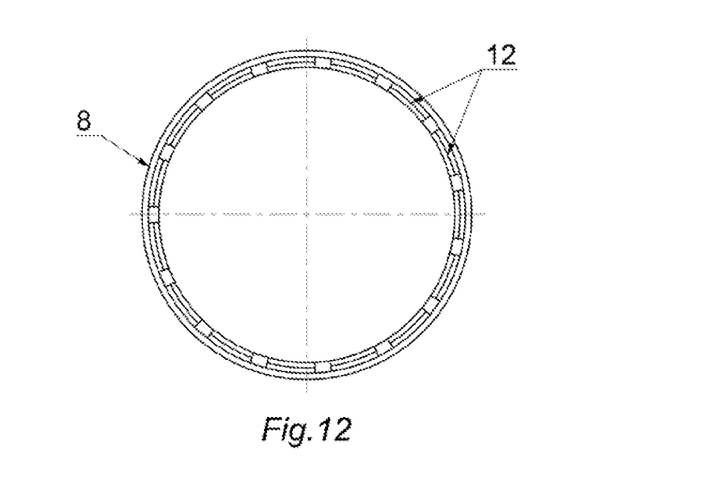
FIG. 12—presents the lid with the energy director which is made up of segments, on a bottom view.

In both examples of the embodiment the energy director 12 or 13 is a single-piece element which shows on FIG. 9 and FIG. 11 accordingly, or is made up of segments which shows on FIG. 10 and FIG. 12 accordingly.

In both examples of the embodiment the bottom surface 10 of the lid 8 does not contact the top surface 4 of the flange 3, and the distance between the bottom surface 10 of the lid 8 and the top surface 4 of the flange 3 corresponds to the height of the energy director 12 or 13, or is slightly larger (FIG. 2, FIG. 3, FIG. 5, FIG. 6).

In both exemplary embodiments there are slits 14, 15 between the side walls of the rib 7 and the side walls of the groove 9 (FIG. 3, FIG. 6).

Formed on the side surface 5 of the flange 3 of the container 1 may be a peripheral groove 16, as shown on FIG. 9 and FIG. 10, which facilitates positioning of the container in the process of ultrasonic welding with the lid rim.

Figure 13:
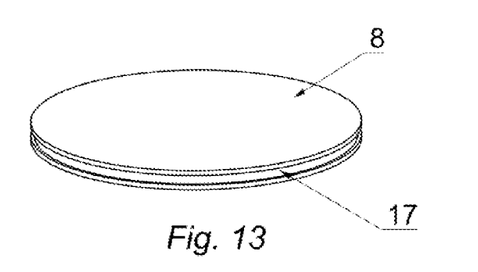
FIG. 13—presents the lid with peripheral groove in the side surface, in a perspective view.
Figure 14:
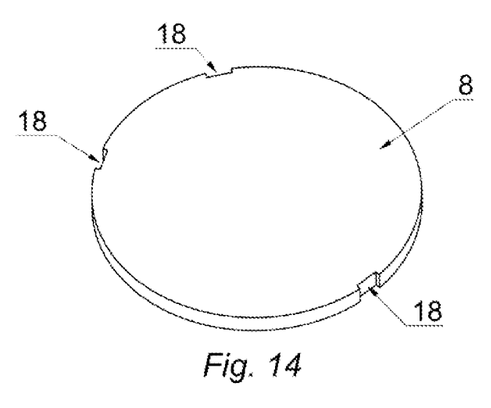
FIG. 14—depicts the lid with transverse grooves in the side surface, in a perspective view.

Formed on the side surface 11 of the lid 8 may be a peripheral groove 17, as shown on FIG. 13, or transverse grooves 18, as shown on FIG. 14, which facilitate its transport to the welding stand, as well as its positioning and keeping in place in the process of ultrasonic welding with the rim of the container body.

The lid 8 is provided with an opening for discharging the contents of the container, sealed prior to the first opening, not shown on the drawing.

Figure 5:
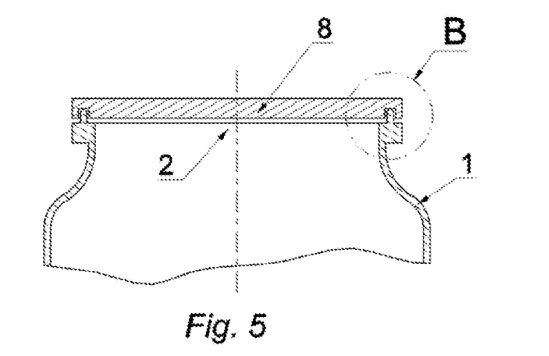
FIG. 5—presents the top part of the container and the lid, as in FIG. 3, assembled together for ultrasonic welding, in cross section.
Figure 8:
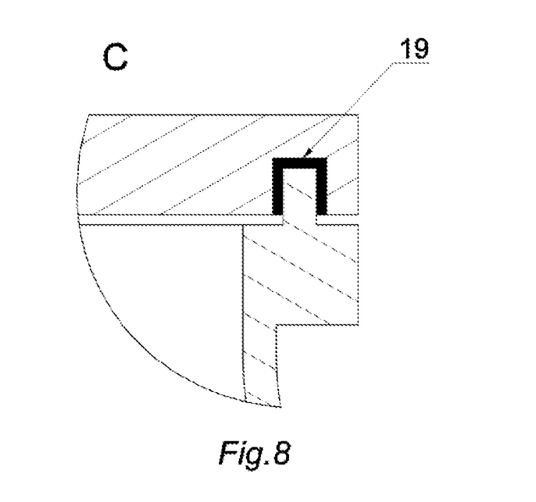
FIG. 8—presents a zoomed-in view of the bond between the container and the lid following ultrasonic welding of the unit as in FIG. 7, in cross-section.

In order to bond the lid 8 with the container 1, the lid 8 is placed on the rim of the container 1 so that the rib 7 gets into the groove 9 (FIG. 2, FIG. 5). The bottom surface 6 of the flange 3 of the container 1 serves as the support for the flange 3 on the sonotrode anvil in the process of ultrasonic welding. In the course of the ultrasonic welding process the lid 8 gets pressed towards the top surface 4 of the flange 3 of the container 1 and is permanently bonded with the container 1 with the weld 19 formed of the energy director 12 or 13, which binds the bottom of the groove 9 with the top of the rib 7 and the side surfaces of the rib 7 with the side surfaces of the groove 9 by filling in the slits 14, 15, as shown on FIG. 8, thus increasing the strength and tightness of the bond.

An exemplary preform 101 of the container 1, made of plastic, has a conical body ended with a bottom on the one side, and with an opening 102 with a profiled rim designed to be bonded with the lid on the other side. The opening 102 can be given e.g. the circular shape. The profiled rim of the opening 102 of the preform 101 has a flange 103 formed around the opening, extending outwards away from the side wall of the preform. The flange 103 has the top surface 104, side surface 105, and bottom surface 106, which is basically perpendicular to the side surface of the preform 101 at their convergence. The bottom surface 106 of the flange 103 serves as the retaining surface in the process of producing the container of the preform, for example in the blow moulding process.

Formed on the top surface 104 of the flange 103 around the opening 102 there is a rib 107 protruding above the surface 104.

Figure 15:
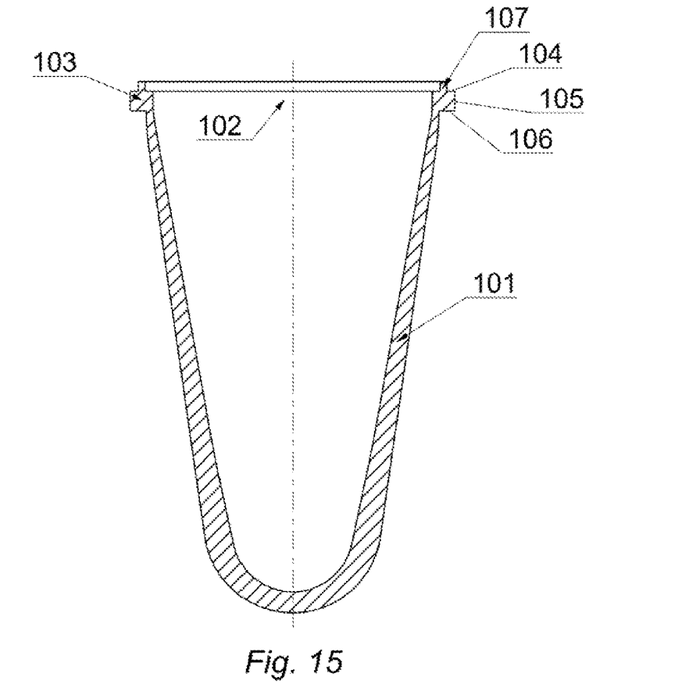
FIG. 15—shows the preform without the energy director and without the peripheral groove in the side surface of the flange, in cross section.

In the first exemplary embodiment shown on FIG. 15 the top surface of the rib 107 is flat.

Figure 16:
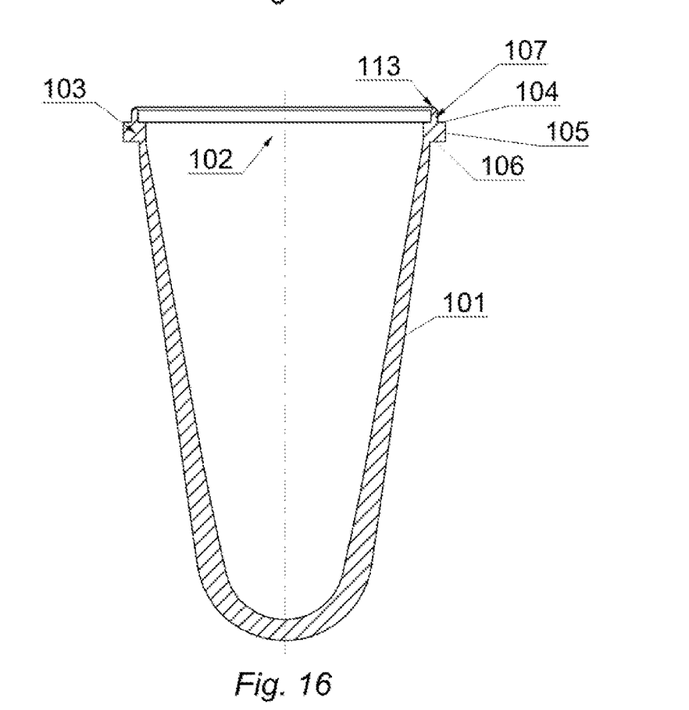
FIG. 16—shows the preform with the energy director and without the peripheral groove in the side surface of the flange, in cross section.
Figure 17:
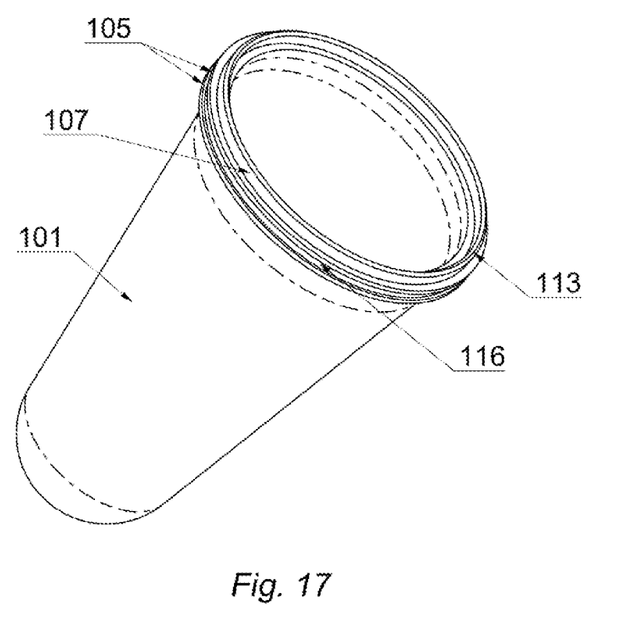
FIG. 17—presents the preform provided with the energy director as a single-piece element, and with the peripheral groove in the side surface of the flange, in a perspective view.
Figure 18:
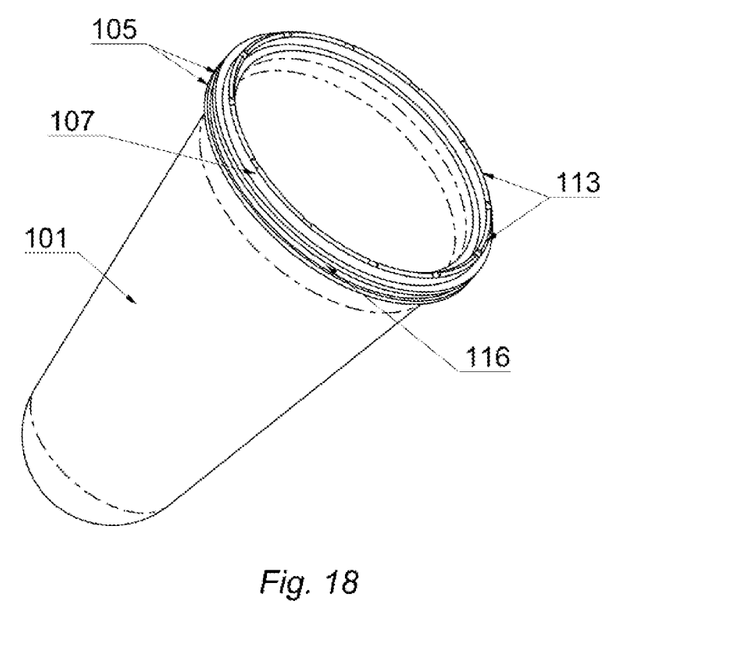
FIG. 18—shows the preform with the energy director which is made up of segments, and with the peripheral groove in the side surface of the flange, in a perspective view.

In the second exemplary embodiment shown on FIG. 16 the rib 107 of the flange 103 ends with the energy director 113 which is as a single-piece element which shows on FIG. 17, or is made up of segments which shows on FIG. 18, triangular in cross section, where the energy director focuses ultrasonic energy in the process of ultrasonic welding of the rib 107 to the lid.

In both exemplary embodiments the flange 103 around the rim of the opening 102 of the preform 101, can have a peripheral groove 116 formed on its side surface 105 (as shown on FIG. 17 and FIG. 18), which facilitates transport of the preform to the container moulding stand and its correct positioning on the stand.

LIST OF NUMERICAL IDENTIFIERS

1—container
2—container opening
3—flange around container opening
4—top surface of container flange
5—side surface of container flange
6—bottom surface of container flange
7—rib on container flange
8—lid
9—groove in the bottom surface of the lid
10—bottom surface of the lid
11—side surface of the lid
12—energy director formed on the lid
13—energy director formed on the rib ridge
14, 15—slits between the side walls of the container flange rib and the side walls of the lid grooves
16—peripheral groove on the side surface of the container flange
17—peripheral groove on the side surface of the lid
18—transverse groove on the side surface of the lid
19—weld
101—preform
102—preform opening
103—preform flange
104—top surface of the preform flange
105—side surface of the preform flange
106—bottom surface of the preform flange
107—preform flange rib
113—energy director on the preform flange rib
116—peripheral groove on the side surface of preform flange

The invention claimed is:

1. A unit for bonding a container with a lid, made of plastic, designated especially for pressurised beverages, comprising:
   a profiled rim of a container opening,
   a profiled rim of the lid, and
   at least one energy director (12, 13) which focuses ultrasonic energy in a process of ultrasonic welding of the profiled rim of the container opening and the profiled rim of the lid, wherein
the profiled rim of the container opening is formed as a rib (7), while the profiled rim of the lid (8) is formed as a groove (9) which accommodates the rib (7), wherein
the profiled rim of the opening (2) of the container (1) comprises a flange (3) formed around the opening (2), extending outwards away from a side wall of the container, wherein the flange (3) has a flat top surface (4), a side surface (5) and a bottom surface (6) formed perpendicular to a side surface of the container (1) at their convergence and connected to an external side surface of the container (1), wherein the rib (7) is formed on the flat top surface (4) of the flange (3) protruding on both sides above the flat top surface (4), while the groove (9) of the lid (8) is formed on a flat bottom surface around a bottom edge of the lid, and at least one energy director (12, 13) is formed on a bottom of the groove (9) and/or a top surface of the rib (7) and supports the lid (8) without touching on the flat top surface (4) of the flange (3) before the process of ultrasonic welding, while after the process of ultrasonic welding, the flat top surface (4) of the flange (3) on both sides of the rib (7) touches the flat bottom surface of the lid (8) on both sides of the groove (9), and wherein the bottom surface (6) of the flange (3) is used as a surface suitable for supporting the container flange on a sonotrode anvil in the process of ultrasonic welding.

2. The unit according to claim 1, wherein the flange (3) around the edge of the opening (2) of the container (1) has a peripheral groove (16) formed on its side surface.

3. The unit according to claim 1, wherein there is a peripheral groove (17) formed on the side surface (11) of the lid (8).

4. The unit according to claim 1, wherein there are transverse grooves (18) formed on the side surface (11) of the lid (8).

5. A preform of a plastic container, comprising a body ended with a bottom on one side, and with an opening with a profiled rim to be bonded with a lid with ultrasonic welding on the other side, while the profiled rim of the opening (102) of the preform (101) has a flange (103) formed around the opening, wherein the flange (103) has a flat top surface (104), a side surface (105) and a bottom surface (106) formed perpendicular to a side surface of the preform (101) at their convergence and bonded to an external side surface of the preform (101), while formed around the opening (102) on the flat top surface (104) of the flange (103) there is-a rib (107), wherein the rib (107) protrudes on both sides of the rib perpendicular above the flat top surface (104) of the flange (103), wherein the rib (107) has the same height on the both sides of the rib and is ended with a flat top surface, wherein there is a peripheral groove (116) formed on the side surface (105) of the flange (103) around the rim of the opening (102) of the preform (101), and wherein the preform is designated for pressurized beverages.

* * * * *